United States Patent Office 3,319,480
Patented May 16, 1967

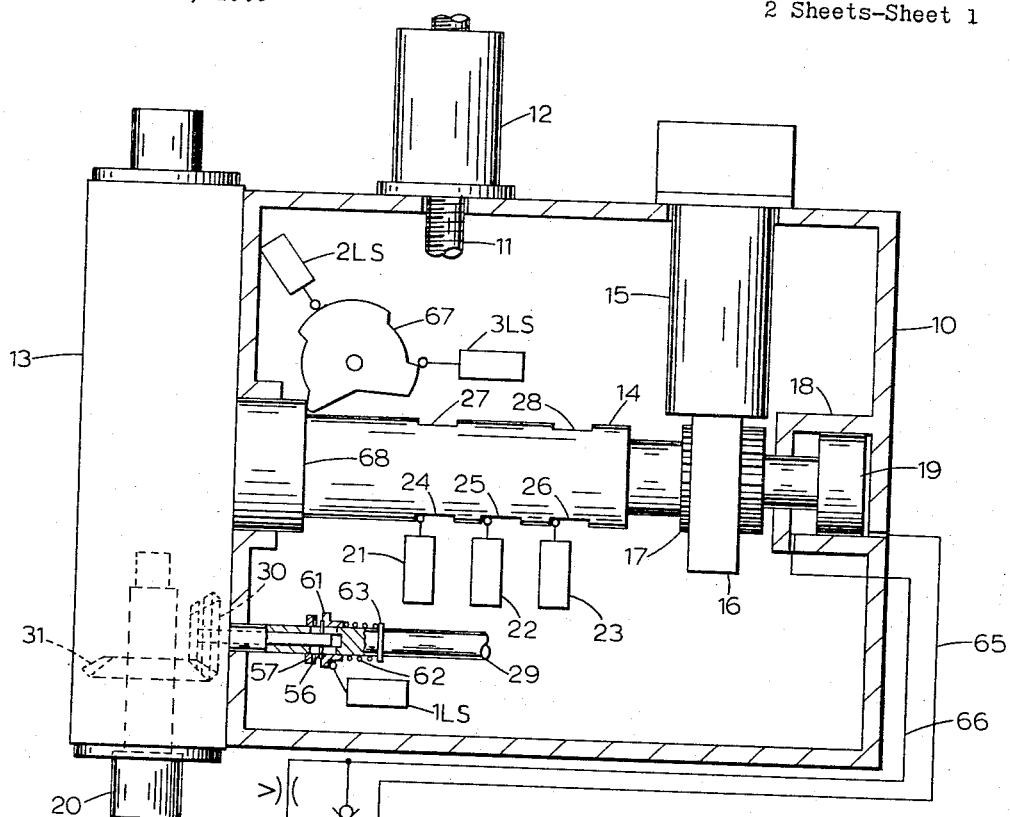
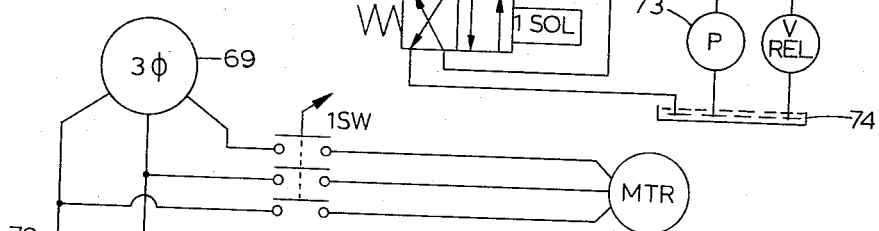
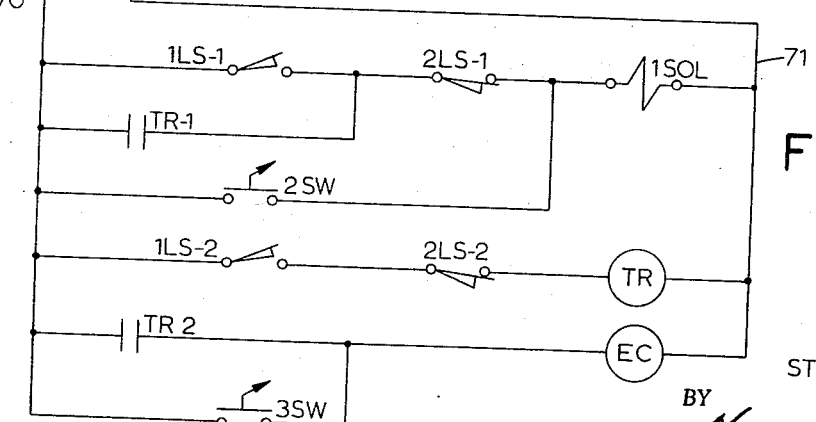

3,319,480
GEAR PROTECTION MECHANISM FOR TRANSMISSION
Stanley A. Pfister, Wilmington, Ohio, assignor to The Cincinnati Milling Machine Co., Cincinnati, Ohio, a corporation of Ohio
Filed Jan. 26, 1965, Ser. No. 428,087
6 Claims. (Cl. 74—339)

This invention relates to transmissions employing gears that are shifted into and out of engagement and more particularly, to a mechanism to prevent damage due to clashing upon the shifting of two power transmission gears together.

It is frequently the situation when gears are shifted together in selected combinations when the gears are not rotated that there is a tooth to tooth engagement that prevents the gears from meshing properly. Frequently the gears are shifted hydraulically and when the tooth to tooth interference occurs the gears are forced into contact at the teeth but do not slide into mesh. If the input power is then applied to the transmission the driving gear begins to rotate and at the same time the two gears either suddenly jump into mesh with a sudden shock or they grind together for a period before getting into mesh. In either situation, sudden catastrophic damage may result to the gears and even in the absence of such damage, the normal useful life of the gears is reduced due to the increased rate at which the gears are worn and caused to deteriorate.

It is therefore an object of this invention to provide a warning mechanism to produce a signal when a tooth to tooth interference occurs during a gear shifting operation.

It is also an object of this invention to provide a mechanism that will detect an improper gear engagement and which will automatically operate to correct the engagement.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred embodiment of this invention, two power transmission gears are slidable into and out of meshing engagement. One of the power transmission gears has a warning gear associated with it that has the same number of teeth and a similar tooth profile. This warning gear is supported with the one power transmission gear and the teeth of the two are maintained in axial alignment. The warning gear also is biased by a yieldable force device to a position spaced from the one power transmission gear. When the two power transmission gears are out of engagement the warning gear is between them so that when they are shifted together the first engagement will be at the warning gear. If the teeth of the warning gear slide into mesh properly, the two power transmission gears are lined up for meshing engagement. If the warning gear's teeth meet with any interference, it yields toward the one gear with which it is associated. A signal device responds to this relative movement of the warning gear to indicate the misalignment of gear teeth. The signal is used to automatically reverse the gear shifting mechanism and to jog one of the gears so that the relative angular positions of the gears are changed. The warning gear, in the preferred embodiment, is made of a relatively soft but tough material that will not cause any damage to the teeth of the power transmission gear with which it engages.

A full understanding of the construction and operation of the invention can be obtained from the following detailed description in which reference is made to the attached drawings wherein:

FIG. 1 is a simplified showing of the spindle carrier of a turret drilling machine, partly in section and with a simplified hydraulic circuit, in which the present invention is included.

FIG. 3 is a schematic showing of an electrical circuit for controlling the automatic operation of the mechanism of this invention.

Figure 2:
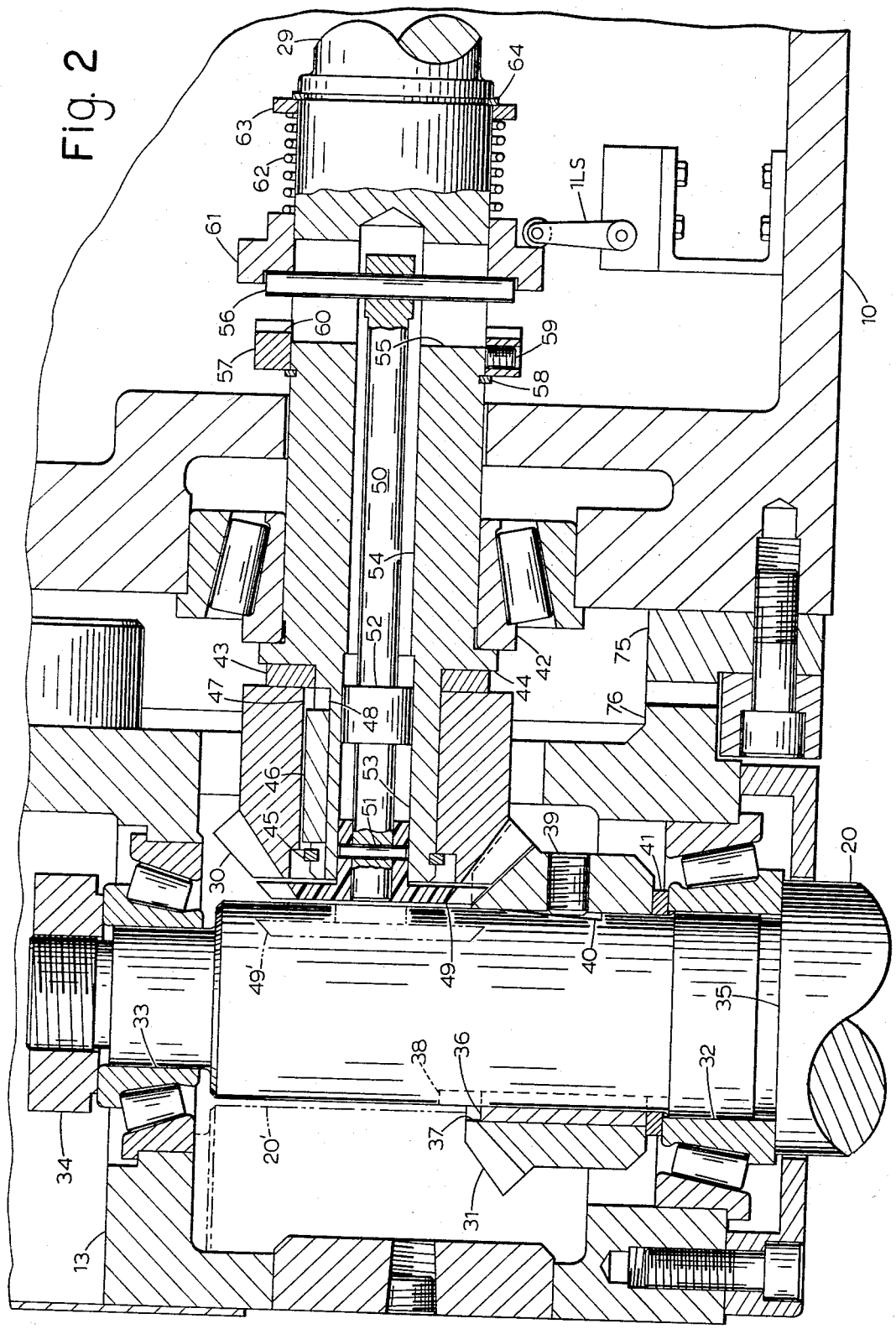
FIG. 2 is a detailed assembly section view of the mechanism of this invention as adapted for use in the spindle carrier of FIG. 1.

The mechanism shown in FIG. 1 includes a spindle carrier housing 10 which is movable along a machine tool column (not shown) as in a conventional vertical drilling machine. The movement of the carrier 10 is produced by rotation of a feed screw 11 through a stationary nut structure 12 fixed on the top of the carrier 10. The carrier 10 supports a radial tool turret 13 on the end of an axle 14 that is rotatable in the carrier 10 and is movable in its axial direction a fixed amount. The indexing of the turret 13 to any one of several equi-spaced angular positions is accomplished by the operation of a differential piston motor unit 15 that is connected to the axle 14 by means of a rack 16 extending from the motor unit 15 and a gear 17 fixed on the axle 14. To free the turret 13 for indexing, the axle 14 is shifted leftward, as viewed in FIG. 1 to move the turret 13 outward away from the carrier 10. This movement of the turret is accomplished by operation of a motor comprising a cylinder 18 and piston 19 at the rearward end of the axle. The cylinder 18 is stationary in the carrier 10 while the piston is fixed on the end of the axle 14. A control circuit, not shown herein but disclosed and described in detail in copending U.S. patent application Ser. No. 57,100 assigned to the assignee of the present application along with further detail of the mechanism described, operates to energize the motor unit 15 to rotate the turret 13 to any one of its predetermined angular positions. In each of these positions one of a plurality of spindles, such as the spindle 20, is oriented vertically to receive and hold a cutting tool for a drilling operation or a similar metal cutting operation. The index control circuit also employs a set of limit switches 21, 22, 23 which are operated in various patterns by a set of flat surfaces or notches 24–28 machined in rows along the axle 14, there being a different pattern of these surfaces 24–28 for each angular position to which the turret 13 is moved. The limit switches 21, 22, 23 provide a feedback signal which indicates that the turret 13 is in a selected angular position. The previously cited patent application describes the switches 21, 22, 23 in detail.

Each of the spindles 20 is independently supported in the turret 13 for rotation one at a time. The spindles are driven from a drive shaft 29 that is rotatably supported in the carrier 10 and on which a beveled drive gear 30 is fixed. The shaft 29 is rotated by an electric motor MTR connected through an electric clutch EC (both shown only schematically in the circuit of FIG. 3) in a conventional manner which is not described in further detail herein since such arrangements are known in the art. The beveled gear 30 is positioned to mesh with and drive a beveled gear 31 that is secured to the spindle 20 and is carried to a location opposite to the gear 30 when the turret 13 is rotated to the angular position shown. Each spindle 20 of the turret 13 has a similar gear 31 fixed thereto for engagement by the gear 30 when each spindle 20 is indexed opposite the gear 30. Since during indexing the turret 13 is shifted leftward, the gear 31 is carried out of mesh with the gear 30 and it is not until the turret 13 is shifted rightward against the carrier 10 that the gears 30, 31 are in mesh. It is during this movement together that interference of the gear teeth can occur to prevent proper engagement of the gears 30, 31 and possibly prevent full movement of the turret as well as to cause damage to the gears 30, 31. It is this possible interference situation that the present invention detects and corrects.

FIG. 2 shows in detail the relation of the gears 30, 31, shaft 29 and the spindle 20 which have only briefly been described thus far. The spindle 20 is received at its forward end in a tapered roller bearing 32 and at its rearward end in a similar bearing 33. The spindle 20 is held in place by a nut 34 turned onto its rearward end and against the bearing 33 until a shoulder 35 is firmly drawn against the forward bearing 32. The gear 31 is rendered rotatable with the spindle 20 by a key 36 extending from a keyway 37 in the gear 31 and into a keyway 38 in the spindle 20. The fixed axial position of the gear 31 on the spindle 20 is maintained by a set-screw 39 that is threaded through the gear 31 and contacts firmly against a notch 40 that is tapered so that a thrust is developed tending to move the gear 31 against a spacer 41 that in turn bears against the bearing 32.

The drive shaft 29 is received at its forward end in tapered roller bearings 42 and is rotatable on an axis at a right angle to the axis of rotation of the spindle 20. The gear 30 is received on the forward end of the shaft 29 and is held axially in place with its rearward end against a spacer 43 that bears in turn against a shoulder 44 by a snap ring 45. A key 46 is provided in keyways 47, 48 in the gear 30 and shaft 29, respectively, to render these two members rotatable in unison. As shown, another smaller gear 49 is received forward of the gear 30 and this gear is also adapted to mesh with the gear 31 on the spindle 20. The gear 49 has the same number of teeth as the gear 30 and, also, the teeth thereon have a similar profile as the teeth of the gear 30. The gear 49 is fixed on the end of a rod 50 by a pin 51. The rod 50 has a larger diameter portion 52 that closely fits but is slidable in a counter-bore 53 in the forward end of the shaft 29. The rod 50 also extends on rearward from the slide portion 52 through an axial bore 54 in the shaft 29 to a point where the bore 54 is intersected by a transverse slot 55 through the shaft 29. A pin 56 is fixed through the end of the rod 50 and is slidable a limited amount along the shaft 29 in the space provided by the transverse slot 55. The forward movement of the pin 56, and consequently of the rod 50 is limited by a stop collar 57 that is held on the shaft 29 by a snap ring 58 and a set screw 59. The collar is provided with an arcuate notch 60 on diametrically opposed sides to provide a seat for the pin 56 in its forward position. The pin 56 is engaged on its rearward side by a collar 61 that is slidable along the shaft 29 and which is constantly urged against the pin 56 by a spring 62 compressed between the collar 61 and a ring 63 held around the shaft 29 by a snap ring 64. Thus, the gear 49 is constantly urged away from the gear 30 and toward the gear 31 to a position 49′ (shown in phantom) dependent upon the stop collar 57. Since the rod 50 is only axially slidable in the shaft 29 by reason of the pin 56 and slot 55, the teeth of the gear 49 are maintained in alignment with the teeth of the gear 30.

When the piston 19, FIG. 1, is shifted leftward by the admission of fluid under pressure to its right side from the fluid line 65 while its other side is connected to a fluid sump 74 through the fluid line 66, the axle 14 is shifted leftward to carry the turret 13 away from the carrier 10 to permit rotary indexing as described. The spindle 20, and the other similar spindles, are carried outward to the position 20′, shown in phantom in FIG. 2, and the turret 13 is in a position to be indexed without interference with either of the gears 30 and 49. The gear 49 is moved leftward to the position 49′ at this time. When the selected spindle 20 has been indexed to its position opposite the gear 30, the pressure differential in the fluid lines 65, 66 is reversed and the piston 19 is moved back to the position shown. This carries the turret 13 rightward as viewed in the drawings and carries the gear 31 toward the gears 30 and 49. If the teeth of these gears are aligned for meshing the turret 13 will be moved to a predetermined rightward position before the gear 49 begins to shift against the bias of the spring 62. However, if the gears 30, 31, 49 are not aligned for meshing, the teeth of the gear 49 will engage the teeth of the gear 31 and the gear 49 will be moved rightward earlier during the rightward stroke of the turret 13 than in the case of proper tooth alignment. It is this earlier movement of the gear 49 that is detected to provide a warning to the mechanism that the gears 30, 31 are not aligned for meshing.

As shown, a limit switch 1LS is provided in the carrier 10 and it is operated by the ring 61 which moves in unison with the gear 49. The limit switch 1LS is adjusted to operate and produce a warning signal soon after the gear 49 begins to shift against the bias of the spring 62. The mechanism also includes another limit switch 2LS, shown in FIG. 1, that is operated during the rightward shift of the turret 13 by a rotary operator 67 that is normally biased to rotate clockwise to remain engaged against a shoulder 68 on the axle 14. The limit switch 2LS is adjusted to operate during the shifting of the turret 13 rightward prior to the operation of the switch 1LS when the teeth of the gears 30, 31, 49 are in meshing alignment. However, when the teeth are not in proper alignment, the switch 1LS is operated earlier than the limit switch 2LS. These two distinct situations will signal either proper or improper gear alignment in correspondence with sequence of switch operation.

The simplified electrical schematic in FIG. 3 illustrates the manner in which the two switch sequences affect the automatic operation of the machine. The spindle motor MTR is energized by the closing of the latch switch SW1 which connects it to the power from a source 69. The switch SW1 is normally closed during machine use. The motor MTR provides the input rotary power to the shaft 29 when connected thereto by a conventional electric clutch EC (shown only schematically in FIG. 3). In the misaligned gear teeth situation, the limit switch 1LS is operated before the limit switch 2LS. Therefore the normally open contacts 1LS–1 are closed before the normally closed contacts 2LS–1 are opened. The solenoid 1SOL is then in a completed circuit across the power lines 70, 71 and is energized. The solenoid 1SOL operates a valve 72, FIG. 1, that controls the pressure differential in the lines 65, 66 to the motor 18, 19. The valve 72 is shown with the solenoid 1SOL deenergized and the fluid pressure from a supply pump 73 is connected to the line 66 while the line 65 is connected to the reservoir or sump 74. The turret 13 is moved to the right as previously described when the lines 65, 66 are so connected. Thus when the solenoid 1SOL is energized, the valve 72 reverses its condition and the pressure differential in the lines 65, 66 also reverses and the turret 13 is caused to move back to the left to disengage the gears 31, 49.

At the same time that the solenoid 1SOL is energized, a timer TR is connected in circuit across the lines 70, 71 by the closing of contacts 1LS–2 before the opening of contacts 2LS–2. Two sets of instantaneous closing, timer opening contacts TR–1, TR–2 are operated by the timer TR. The timer contacts TR–1 momentarily latch the solenoid 1SOL in its energized condition since these contacts are in parallel with the contacts 1LS–1. At the same time, the electric clutch EC is energized momentarily through the contacts TR–2 to jog the shaft 29 by connecting it in train with the motor MTR. At the end of the brief timed period, the contacts TR–1 and TR–2 open and the solenoid 1SOL is deenergized to cause the turret 13 to again move back toward the carrier 10. If the jogging of the gears 30, 49 with the shaft 29 has resulted in the teeth still interfering, the procedure will repeat again automatically. However, if the teeth now line up, the contacts 2LS-1 and 2LS-2 will open before the contacts 1LS-1 and 1LS-2 close and the solenoid 1SOL and timer TR will not be energized. The turret 13 then will be shifted against the carrier 10 so that the gears 30, 31 are in mesh and so that a set of mating locator rings 75, 76, having matching teeth, are brought together to lock the turret 13 against angular movement. The rings 75, 76 are fixed, respectively, to the carrier 10 and turret 13 with their toothed faces opposite one another. A third limit switch 3LS is provided in the carrier 10 and is operated by the member 67 when the turret 13 is seated against the carrier 10 with the rings 75, 76 engaged. This provides a signal to initiate the automatic cycling of the machine in a cutting operation. Circuitry for such a cycle is conventional and not shown herein.

As shown in FIG. 3 a pair of manually operated latching switches 2SW and 3SW are shown in circuit with the solenoid 1SOL and the clutch EC. These provide the machine operator with means to selectively disengage the turret 13 and carrier 10 and to connect power to the shaft 29 apart from the described automatic operation. The separation of the turret 13 and carrier 10 and their reengagement with one another with the automatic tooth interference protection can be considered as being initiated by the manual switch 2SW although completely automatic machine cycling circuitry, as well known in the art, could be substituted at this point. The interference detection and correction would, however, proceed as described with reference to the simplified circuit of FIG. 3.

The gear 49 in the preferred form is composed of a tough plastic material, such as nylon, which is softer than the gears 30, 31 to prevent damage to the teeth of the gear 31. Since the gear 49 needs to transmit no torque load, such use of a relatively soft material provides a workable system having reduced cost and improved wear features. While the invention has been described in connection with one possible form or embodiment thereof, it is to be understood that the present disclosure is illustrative rather than restrictive and that changes and modifications may be made without departing from the spirit of the invention or the scope of the claims which follow.

What is claimed is:
1. A transmission comprising in combination:
(a) a first toothed gear,
(b) a second gear having teeth adapted to mesh with said first gear,
(c) a third gear having teeth in the same number and similar profile as said second gear,
(d) means for supporting said second and third gears in axial alignment as a unit with the teeth thereof in axial alignment for simultaneous meshing engagement with said first gear,
(e) means for yieldably holding said third gear axially spaced from said second gear and toward said first gear,
(f) means for relatively axially shifting said first gear and said second and third gears in a selected direction to move said gears into and out of mesh, and
(g) means for detecting an axial movement of said third gear toward said second gear and for producing a warning signal in response to said axial movement to indicate misalignment of the teeth of said first and second gears when said first gear and said second and third gears are relatively shifted together.

2. A transmission comprising in combination:
(a) a first power transmission gear having teeth therearound,
(b) a second power transmision gear having teeth adapted to mesh with said first gear teeth,
(c) a third gear having teeth in the same number and similar profile as said second gear, said third gear teeth substantially softer than the teeth of said first and second gears,
(d) means for supporting said second and third gears in axial alignment as a unit with the teeth thereof in axial alignment for simultaneous meshing engagement with said first gear,
(e) means for yieldably holding said third gear axially spaced from said second gear and toward said first gear,
(f) means for relatively shifting said first gear and said second and third gears in a selected direction to move said gears into and out of mesh,
(g) means for detecting an axial movement of said third gear toward said second gear and for producing a warning signal in response to said axial movement when said first gear and said second and third gears are relatively shifted toward meshing engagement to indicate misalignment of the teeth thereof, and
(h) means for reversing the direction of relative movement of said first gear and said second and third gears in response to said warning signal.

3. A transmission comprising in combination:
(a) a first power transmission gear having teeth therearound,
(b) a second power transmission gear having teeth adapted to mesh with said first gear teeth,
(c) a third gear having teeth in the same number and similar profile as said second gear,
(d) means for supporting said second and third gears in axial alignment as a unit with the teeth thereof in axial alignment for simultaneous meshing engagement with said first gear,
(e) means for yieldably holding said third gear axially spaced from said second gear and toward said first gear,
(f) means for relatively shifting said first gear and said second and third gears in a selected direction to move said gears into and out of mesh,
(g) means for detecting axial movement of said third gear toward said second gear and for producing a warning signal in response to said axial movement when said first gear and said second and third gears are relatively shifted toward meshing engagement to indicate misalignment of the teeth thereof,
(h) means for reversing the direction of relative movement of said first gear and said second and third gears in response to said signal,
(i) a source of power in train with one of said first and second gears energizable to furnish input power thereto, and
(j) means for momentarily energizing said source of power to jog said one gear upon reversal of direction of relative movement of said first gear and said second and third gears in response to said warning signal.

4. A transmission comprising in combination:
(a) a first toothed gear,
(b) a second gear having teeth adapted to mesh with said first gear,
(c) a third gear having teeth in the same number and similar in profile as the teeth of said second gear,
(d) means for supporting said second and third gears in axial alignment as a unit,
(e) means for maintaining the teeth of said second and third gears in axial alignment,
(f) means for yieldably holding said third gear at a position spaced axially from said second gear and toward said first gear,
(g) means for axially shifting said first gear in a selected direction relative to said second and third gears, and
(h) means for detecting an axial movement of said third gear toward said second gear and for producing a warning signal to indicate misalignment of the teeth of said first and second gears when said first gear is shifted axially toward said second and third gears.

5. A transmission comprising in combination:
(a) a first power transmission gear having teeth therearound,
(b) a second power transmission gear having teeth adapted to mesh with said first gear,
(c) a third gear having teeth in the same number and similar profile as the teeth of said second gear, said third gear teeth substantially softer than the teeth of said first and second gears,
(d) means for supporting said second and third gears in axial alignment as a unit,
(e) means for maintaining the teeth of said second and third gears in axial alignment,
(f) means for yieldably holding said third gear at a position spaced axially from said second gear and toward said first gear,
(g) means for relatively shifting said first gear and said second and third gears into and out of mesh,
(h) means for detecting axial movement of said third gear toward said second gear and for producing a warning signal to indicate misalignment of the teeth of said first and second gears when said first gear and said second and third gears are shifted into mesh.

6. A transmission comprising in combination:
(a) a first beveled power transmission gear having teeth therearound,
(b) a second beveled power transmission gear having teeth adapted to mesh with said first gear,
(c) a third beveled gear having teeth in the same number, angular spacing and similar profile as the teeth of said second power transmission gear, said third gear smaller in diameter than said second gear and the teeth thereof substantially softer than the teeth of said power transmission gears,
(d) means for supporting said second and third gears in concentric axial alignment as a unit,
(e) means for maintaining the teeth of said second and third gears in axial alignment,
(f) means for yieldably holding said third gear at a position spaced axially from said second power transmission gear and toward said first power transmission gear,
(g) means for relatively shifting said first gear and said second and third gears selectively into and out of mesh,
(h) means for detecting axial movement of said third gear toward said second power transmission gear and for producing a warning signal in response to said axial movement to indicate misalignment of the teeth of said first and second power transmission gears when said gears are relatively shifted into mesh,
(i) means for reversing the direction of relative movement of said gears in response to said warning signal, and
(j) means for momentarily jogging one of said power transmission gears upon reversal of relative movement of said gears in response to said warning signal.

References Cited by the Examiner
UNITED STATES PATENTS 2,529,067 11/1950 Bennett et al. _____ 74—339
2,892,524 6/1959 Sinclair _____ 74—339

ROBERT M. WALKER, *Primary Examiner.*

DAVID J. WILLIAMOWSKY, *Examiner.*

H. S. LAYTON, *Assistant Examiner.*